United States Patent
Ueda et al.

(10) Patent No.: US 11,008,118 B2
(45) Date of Patent: May 18, 2021

(54) AIRSPEED MEASUREMENT SYSTEM

(71) Applicants: OMRON Corporation, Kyoto (JP); ARCHITECT GRAND DESIGN, INC., Tokyo (JP)

(72) Inventors: Naotsugu Ueda, Funabashi (JP); Katsuyuki Yugami, Shiga (JP); Hirotaka Okuda, Ichinomiya (JP); Yoshihisa Toyosaki, Tokyo (JP)

(73) Assignees: Omron Corporation, Kyoto (JP); ARCHITECT GRAND DESIGN, INC., Tokyo (JP)

( * ) Notice: Subject to any disclaimer, the term of this patent is extended or adjusted under 35 U.S.C. 154(b) by 272 days.

(21) Appl. No.: 15/899,283

(22) Filed: Feb. 19, 2018

(65) Prior Publication Data

US 2018/0237155 A1    Aug. 23, 2018

Related U.S. Application Data

(63) Continuation of application No. PCT/JP2016/079242, filed on Oct. 3, 2016.

(30) Foreign Application Priority Data

Oct. 28, 2015 (JP) .............................. JP2015-212377

(51) Int. Cl.
| | |
|---|---|
| *G06F 7/70* | (2006.01) |
| *G06G 7/00* | (2006.01) |
| *G06G 7/76* | (2006.01) |
| *B64D 43/02* | (2006.01) |
| *B64C 27/08* | (2006.01) |
| *B64C 39/02* | (2006.01) |

(Continued)

(52) U.S. Cl.
CPC .............. *B64D 43/02* (2013.01); *B64C 27/08* (2013.01); *B64C 39/02* (2013.01); *G01P 5/10* (2013.01); *G01P 5/12* (2013.01); *B64C 2201/024* (2013.01)

(58) Field of Classification Search
CPC ......... B64D 43/02; B64C 27/08; B64C 39/02; G01P 5/10; G01P 5/12
USPC ........................................................... 701/14
See application file for complete search history.

(56) References Cited

U.S. PATENT DOCUMENTS

| | | |
|---|---|---|
| 3,604,261 A | 9/1971 | Olin |
| 6,101,429 A | 8/2000 | Sarma et al. |
| 6,134,958 A | 10/2000 | Djorup |

(Continued)

FOREIGN PATENT DOCUMENTS

| | | |
|---|---|---|
| CN | 1828253 A | 9/2006 |
| CN | 101564599 A | 10/2009 |

(Continued)

OTHER PUBLICATIONS

English Translation for DE102007034321A1.*

(Continued)

*Primary Examiner* — Mahmoud S Ismail
(74) *Attorney, Agent, or Firm* — Osha Bergman Watanabe & Burton LLP

(57) ABSTRACT

A technique enables horizontal measurement of the airspeed of a low-speed flight vehicle. An airspeed measurement system is for a low-speed flight vehicle, and includes a flow sensor that measures an airspeed along at least two axes in a horizontal direction during flight of the low-speed flight vehicle.

15 Claims, 10 Drawing Sheets

(51) Int. Cl.
*G01P 5/10* (2006.01)
*G01P 5/12* (2006.01)

(56) References Cited

U.S. PATENT DOCUMENTS

| | | | |
|---|---|---|---|
| 6,419,186 | B1 | 7/2002 | Bachinski et al. |
| 9,031,719 | B2 | 5/2015 | Hall et al. |
| 2011/0295569 | A1 | 12/2011 | Hamke et al. |
| 2015/0296342 | A1* | 10/2015 | Boukallel .......... H04W 64/006 455/456.1 |
| 2016/0247115 | A1* | 8/2016 | Pons .................... G06Q 10/087 |

FOREIGN PATENT DOCUMENTS

| | | | |
|---|---|---|---|
| CN | 102073755 A | | 5/2011 |
| CN | 102288777 A | | 12/2011 |
| CN | 102323440 A | | 1/2012 |
| CN | 103713152 A | | 4/2014 |
| CN | 103969022 A | | 8/2014 |
| CN | 104318107 A | | 1/2015 |
| DE | 102007034321-1 | * | 1/2009 .......... B60T 8/17551 |
| DE | 102007034321 A1 | | 1/2009 |
| JP | S59-220649 A | | 12/1984 |
| JP | 2001-278196 A | | 10/2001 |
| JP | 2006-162423 A | | 6/2006 |
| JP | 2008-094278 A | | 4/2008 |
| JP | 2011214994 A | | 10/2011 |
| JP | 2011-246105 A | | 12/2011 |
| WO | 01/74663 A1 | | 10/2001 |
| WO | WO-0174663 A1 | * | 10/2001 ............ G01P 13/025 |
| WO | WO-2008116644 A2 | * | 10/2008 ................ G01P 5/10 |
| WO | 2009/013095 A2 | | 1/2009 |

OTHER PUBLICATIONS

Extended Search Report issued in European Application No. 16859478.6, dated Oct. 9, 2018 (9 pages).
Zhu Yanqing, et al., "2-D Micromachined Thermal Wind Sensors-A Review," IEEE Internet of Things Journal, IEEE, vol. 1, No. 3, Jun. 1, 2014, pp. 216-232, XP011549642 (17 pages).
International Search Report issued in Application No. PCT/JP2016/079242, dated Dec. 27, 2016 (2 pages).
Written Opinion issued in Application No. PCT/JP2016/079242, dated Dec. 27, 2016 (4 pages).
Office Action issued in Japanese Application No. 2015-212377; dated Jun. 25, 2019 (6 pages).
Office Action issued in Chinese Application No. 201680048332.4; dated Sep. 24, 2019 (18 pages).
L. Xiong et al. "Research progress in air data sensor technology for attack helicopter" Second Period of Roll 34 of Sensor and Microsystem, pp. 5-8, Feb. 2015 (4 pages).
Office Action in counterpart Chinese Patent Application No. 201680048332.4 dated Apr. 28, 2020 (11 pages).

* cited by examiner

AIRSPEED MEASUREMENT SYSTEM

CROSS-REFERENCE TO RELATED APPLICATIONS

Patent Literature 1: U.S. Pat. No. 9,031,719.
Patent Literature 2: Japanese Unexamined Patent Application Publication No. 2011-246105.

BACKGROUND OF THE INVENTION

The present invention relates to an airspeed measurement system.

Techniques for determining a local wind field based on airspeed and ground speed have been developed (e.g., Patent Literature 1). A technique described in Patent Literature 1 is applicable to helicopters and aircraft. Patent Literature 1 also describes processing that uses no airspeed sensor. Another known technique for estimating wind speed includes modeling the acceleration of an unmanned aerial vehicle (UAV) using an estimated ground speed of the UAV and integrating a difference between the modeled acceleration and an actual acceleration measured using a sensor (e.g., Patent Literature 2). The technique described in Patent Literature 2 further includes estimating airspeed based on the sum of the estimated wind speed and the ground speed.

Multicopters, multirotor UAVs, or other small unmanned aircraft, which are relatively compact and low-speed flight vehicles, are typically powered by batteries, and thus may not fly continuously for a long time. Possible flight times for such vehicles estimated using, for example, acceleration, can change depending on the flight speed or the wind speed, and thus are difficult to estimate accurately. Existing airspeed indicators on aircraft, such as pitot tubes, are commonly used for unidirectional measurement of airspeed, and are unsuitable for flight vehicles that are movable in all directions.

In response to the above issue, one or more aspects of the present invention are directed to a technique for horizontally omnidirectional measurement of the airspeed of a low-speed flight vehicle.

BRIEF SUMMARY OF THE INVENTION

An aspect of the present invention provides an airspeed measurement system for a low-speed flight vehicle including a flow sensor that measures an airspeed along at least two axes in a horizontal direction during flight of the low-speed flight vehicle.

This airspeed measurement system enables horizontal measurement of the airspeed of a low-speed flight vehicle.

The flow sensor may be a 2-axis flow sensor that measures an airspeed along two axes that are orthogonal to each other in a horizontal direction during flight of the low-speed flight vehicle. More specifically, this structure enables efficient horizontal measurement of the airspeed.

The 2-axis flow sensor may be a 2-axis thermal flow sensor including at least one heat source and two sets of temperature sensors that are arranged along the two axes orthogonal to each other. The temperature sensors in each set are arranged on both sides of the heat source in a predetermined axis direction of the heat source. The thermal flow sensor is particularly highly sensitive at low speeds, and thus is suitable for measuring the airspeed of a low-speed flight vehicle.

The airspeed measurement system may further include a 1-axis flow sensor that measures an airspeed along an axis in a vertical direction during flight of the low-speed flight vehicle. This airspeed measurement system can detect an abrupt nosedive or an updraft based on the measured vertical airspeed. Such information will be useful in, for example, controlling the balance of a low-speed flight vehicle.

The 1-axis flow sensor may be a 1-axis thermal flow sensor including a heat source and temperature sensors that are arranged on both sides of the heat source in a vertical direction during flight of the low-speed flight vehicle. The thermal flow sensor with this structure may be used.

The airspeed measurement system may further include at least one member selected from a temperature sensor that measures a temperature around the low-speed flight vehicle, an atmospheric pressure sensor that measures an atmospheric pressure around the low-speed flight vehicle, and a geomagnetic sensor that measures a geomagnetism around the low-speed flight vehicle. The measurement data obtained from such sensors may further be used to, for example, improve the accuracy of the airspeed measured by the airspeed measurement system or to determine absolute wind directions.

The low-speed flight vehicle may be a multicopter including a plurality of rotary wings each having a rotation axis in a vertical direction during flight of the low-speed flight vehicle. The airspeed measurement system may be used for the multicopter.

The low-speed flight vehicle may include a flight vehicle body and a plurality of rotary wings arranged around the flight vehicle body in a vertical direction during flight, and the flow sensor may be mounted on the flight vehicle body. For a multicopter including a plurality of rotary wings around the flight vehicle body, a flow sensor (e.g., a 2-axis flow sensor) may be mounted on the flight vehicle body to reduce the influence of airflow generated by the rotary wings on the measurement values.

The low-speed flight vehicle may include a flight vehicle body and a plurality of rotary wings arranged around the flight vehicle body in the vertical direction during flight, and the 1-axis flow sensor may be mounted outside the rotary wing with respect to the flight vehicle body. This airspeed measurement system enables vertical measurement of the airspeed while reducing the influence of airflow generated by the rotary wings on the measurement values.

The aspects described in the solution to the problem section may be combined to the extent possible without departing from the issue and the technical idea of the present invention.

The technique enables horizontally omnidirectional measurement of the airspeed of a low-speed flight vehicle.

DETAILED DESCRIPTION

Embodiments of the present invention will now be described with reference to the drawings. The embodiments described below are mere examples, and an airspeed measurement system according to the embodiments of the present invention is not limited to the structures described below.

Device Structure

Figure 1:
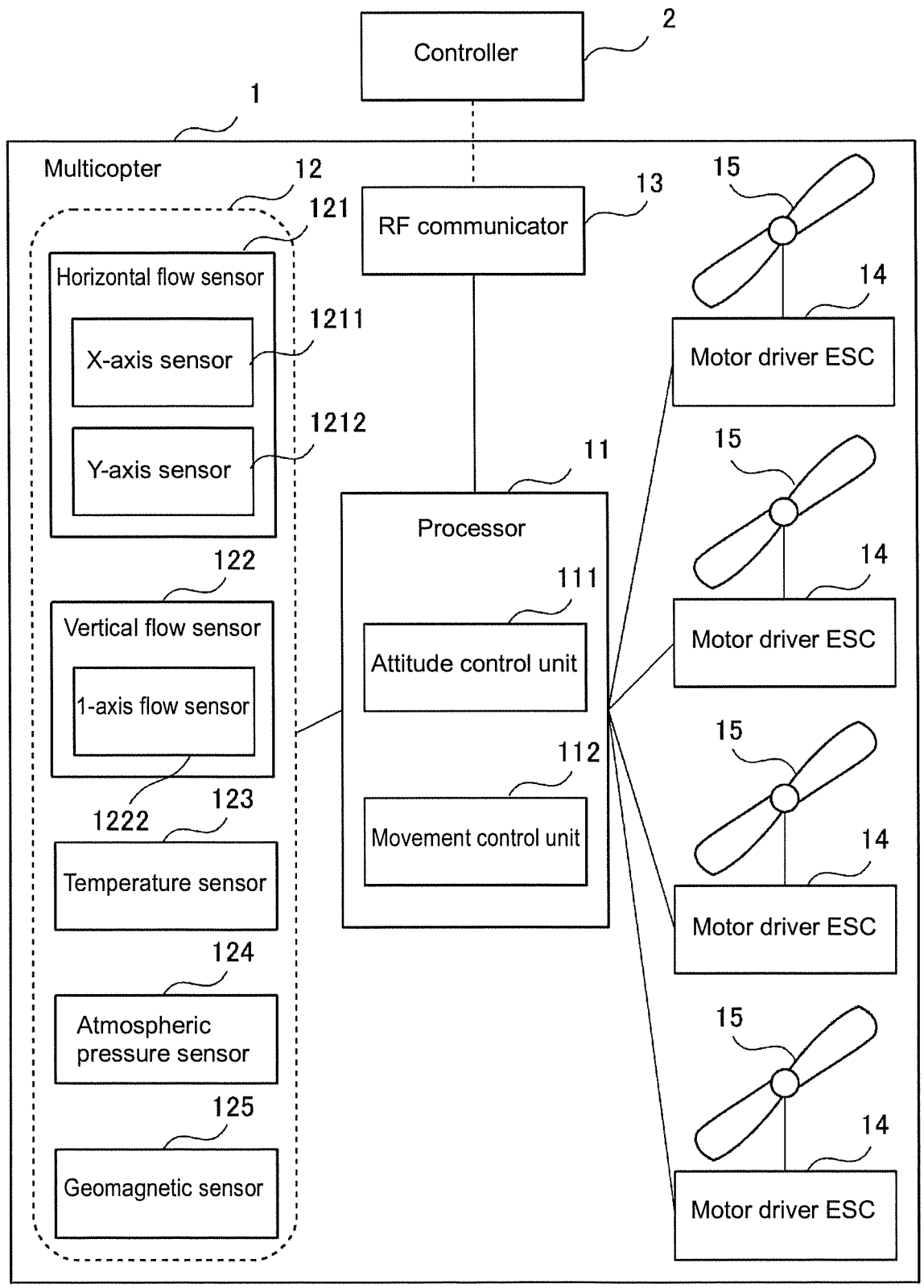
FIG. 1 is a block diagram of a multicopter including an airspeed measurement system according to one embodiment.

FIG. 1 is a block diagram of a multicopter including an airspeed measurement system according to one embodiment. The multicopter 1 is a relatively compact and low-speed flight vehicle, and includes four rotors (rotary wings) in the example shown in FIG. 1. The multicopter 1 includes a processor 11, a set of sensors 12, a radio frequency (RF) communicator 13, and four sets of motor driver electronic speed controllers (ESCs) 14 and rotors 15. A controller 2 transmits a radio signal for moving the multicopter 1 to the RF communicator 13 in response to a user operation.

The processor 11, which is for example a general-purpose integrated circuit, controls the motor driver ESCs 14 based on sensing data measured by the set of sensors 12 or in response to a radio signal from the controller 2 received by the RF communicator 13. More specifically, the processor 11 functions as an attitude control unit 111 or a movement control unit 112 in cooperation with a program executed by the processor 11. The processor 11 may be a small circuit, such as a microcontroller.

The set of sensors 12 includes a horizontal flow sensor 121, a vertical flow sensor 122, a temperature sensor 123, an atmospheric pressure sensor 124, and a geomagnetic sensor 125. Although not shown in FIG. 1, the processor 11 and the sensors are connected to one another. The horizontal flow sensor 121 is a flow velocity sensor that measures the airflow velocity along two axes that are orthogonal to each other. More specifically, the sensor includes temperature sensors on both sides of a heat source such as a heater in a predetermined axis direction. The temperature sensors output airflow velocity in accordance with the mass flow rate of air caused by heat movement. The horizontal flow sensor 121 includes an X-axis sensor 1211 and a Y-axis sensor 1212. The X-axis sensor 1211 and the Y-axis sensor 1212 are 1-axis flow sensors. The sensor including the X-axis sensor 1211 and the Y-axis sensor 1212 and enabling flow velocity measurement in all directions in a plane is also referred to as a 2-axis flow sensor.

Figure 2:
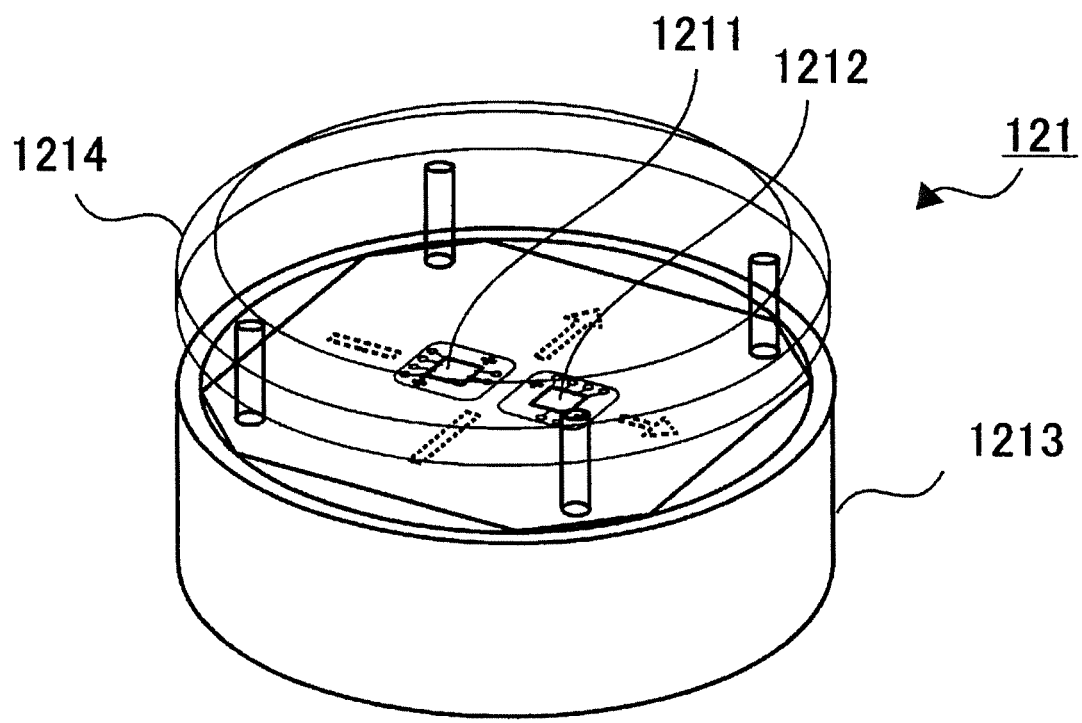
FIG. 2 is a perspective view of an example horizontal flow sensor.
Figure 3:
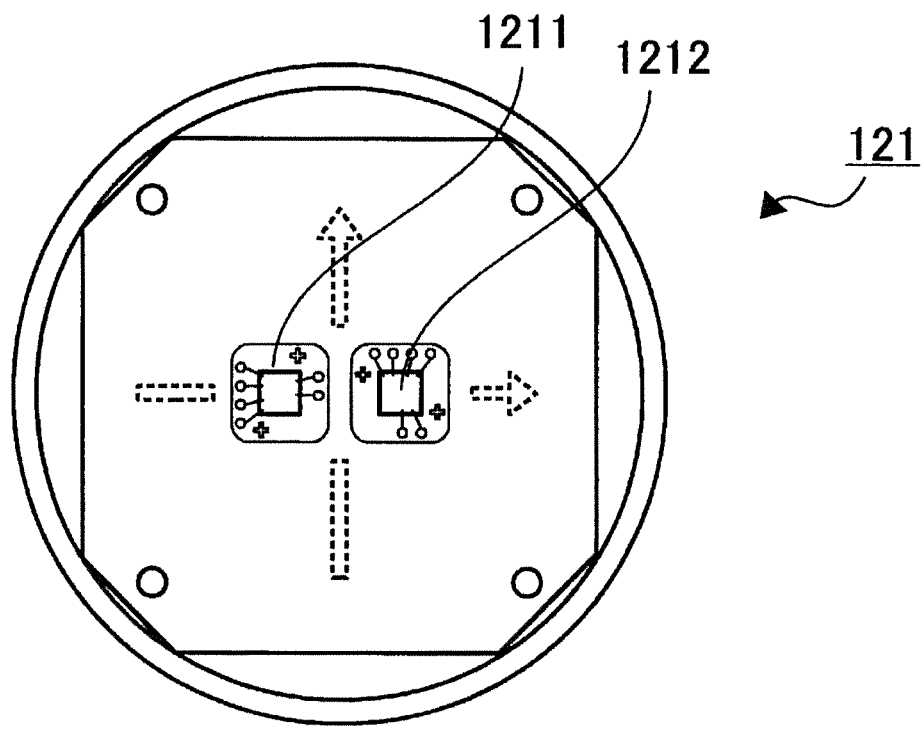
FIG. 3 is a plan view of the horizontal flow sensor.
Figure 4:
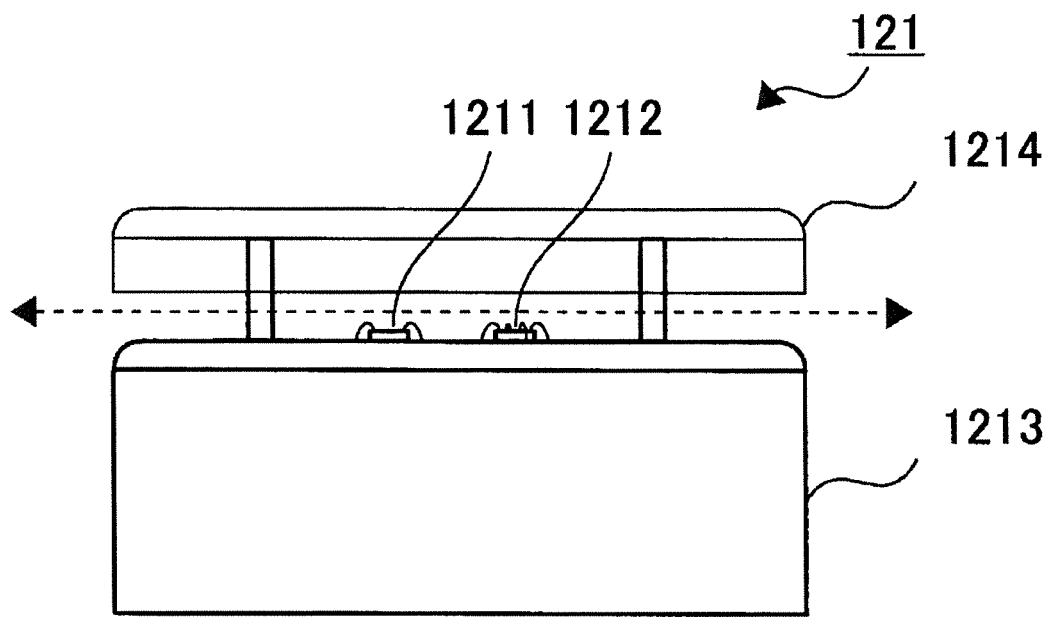
FIG. 4 is a front view of the horizontal flow sensor.

FIG. 2 is a perspective view of an example of the horizontal flow sensor 121. FIG. 3 is a plan view of the horizontal flow sensor 121. FIG. 4 is a front view of the horizontal flow sensor 121. The horizontal flow sensor 121 includes the X-axis sensor 1211 and the Y-axis sensor 1212. The X-axis sensor 1211 and the Y-axis sensor 1212 are thermal flow sensors including sensor elements such as a heater and thermopiles. The X-axis sensor 1211 and the Y-axis sensor 1212 are mounted on a base 1213 in directions orthogonal to each other. A cover 1214 is arranged above the base 1213, and the X-axis sensor 1211 and the Y-axis sensor 1212 with a predetermined space from the base and the sensors. The base 1213 and the cover 1214 are connected with four rods. As indicated by dashed arrows in FIG. 4, the base 1213 and the cover 1214 allow passage of air between them in the horizontal direction.

Figure 5:
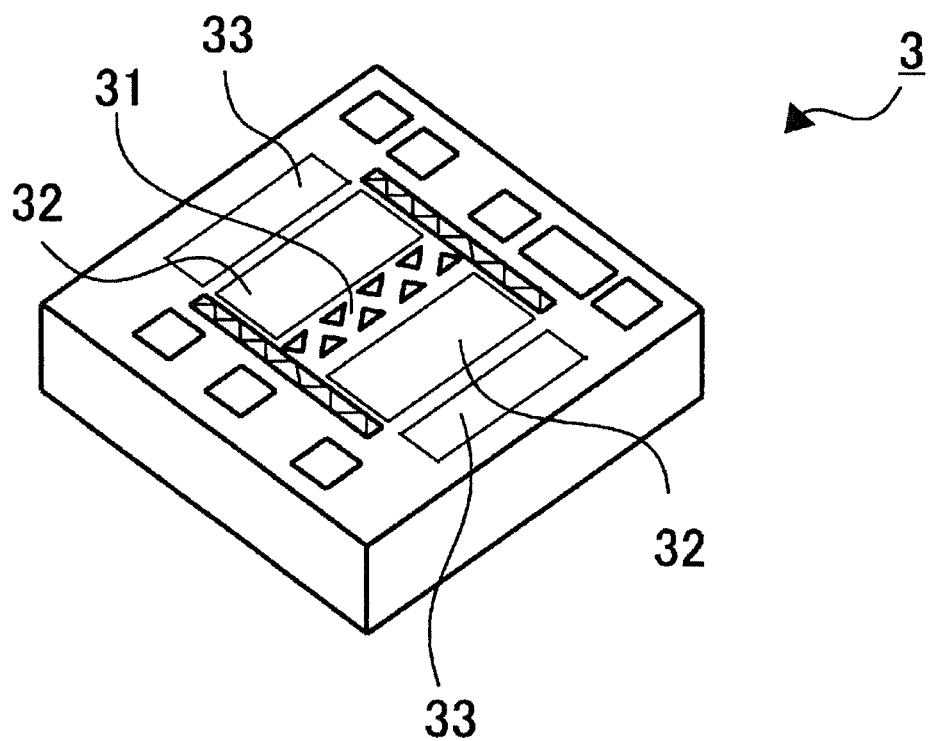
FIG. 5 is a perspective view of an example sensor element.
Figure 6:
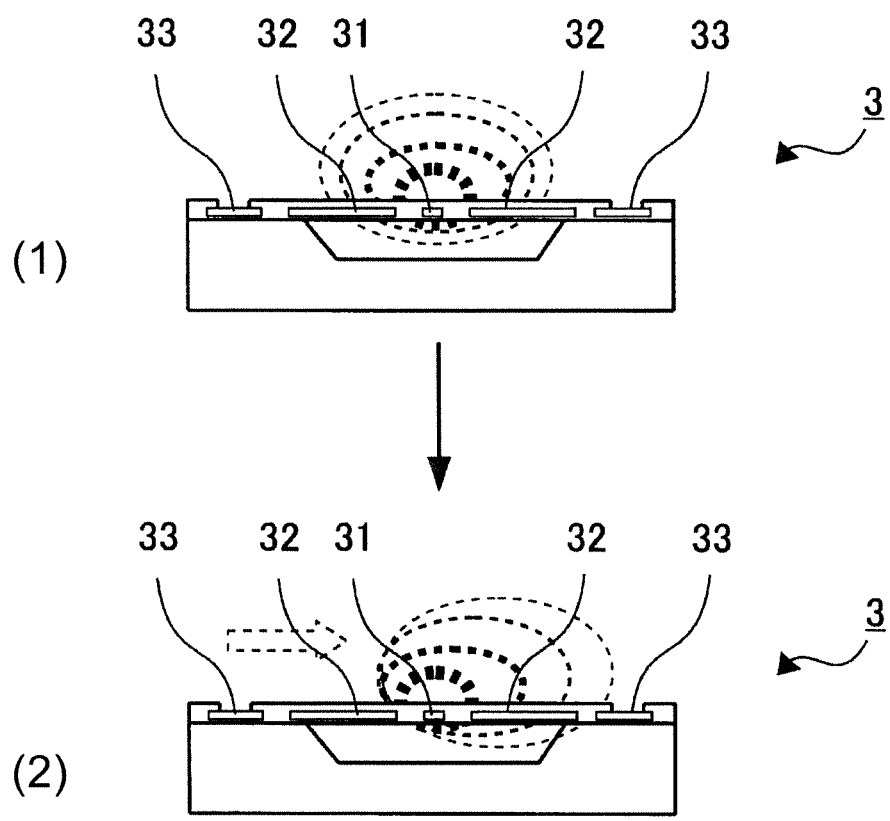
FIG. 6 is a cross-sectional view of the sensor element illustrating its mechanism.

FIG. 5 is a perspective view of an example sensor element used as the X-axis sensor and the Y-axis sensor. FIG. 6 is a cross-sectional view of the sensor element illustrating its mechanism. The sensor element 3 includes a heater 31, thermopiles 32 located on both sides of the heater 31, and ambient temperature sensors 33 arranged outside the thermopiles. These components are sandwiched between upper and lower insulating thin films, and mounted on a silicon base. The silicon base has a cavity (opening) under the heater 31 and the thermopiles 32. The heater 31 may be a polysilicon resistor. In FIG. 6, the heater 31 generates heat with the temperature distribution schematically indicated by dashed ellipses, of which a thicker line indicates a higher temperature. With no airflow, the temperature distribution across the heater 31 is substantially uniform as shown in the upper part (1) of FIG. 6. With an airflow in, for example, the direction indicated by a dashed arrow in the lower part (2) of FIG. 6, the ambient air moves and the temperature becomes higher on the leeward side of the heater 31 than on the windward side. The sensor element measures the flow velocity based on the bias in the distribution of the heat from the heater.

The output voltage $\Delta V$ can be written by Formula 1 below.

$$\Delta V = A \cdot (T_h - T_a) \sqrt[b]{v_f} \quad (1)$$

In this formula, $T_h$ is the temperature of the heater 31, $T_a$ is the temperature measured by an ambient temperature sensor 33, $V_f$ is the average value of the flow velocity, and A and b are predetermined constants. The horizontal flow sensor 121 shown in FIGS. 2 to 4 can determine the wind speed through the composition of vectors, and can also determine the wind deviation angle indicating the horizontal wind direction. In other words, an airspeed v can be obtained using Formula 2 below.

$$v = \sqrt{v_x^2 + v_y^2} \quad (2)$$

In this formula, $v_x$ is the output value from the X-axis sensor, and $x_y$ is the output value from the Y-axis sensor. For example, tan θ can be written by Formula 3 below, where θ is the angle between the X-axis and the wind direction.

$$\tan\theta = \frac{v_y}{v_x} \quad (3)$$

The horizontal flow sensor 121 mounted horizontally on the multicopter 1 thus enables horizontal measurement of the airspeed of the multicopter 1. When the multicopter 1 moves horizontally, the body may roll during flight. However, the horizontal airspeed may be measured substantially accurately based on the air flowing between the base 1213 and the cover 1214 of the horizontal flow sensor 121 described above. In other words, the embodiment covers measurement in which the plane including the two axes of the horizontal flow sensor 121 tilts from the horizontal plane during flight.

The vertical flow sensor 122 is also a flow velocity sensor that measures the airflow velocity along one axis in a predetermined direction. The vertical flow sensor 122 performs measurement based on the same mechanism as the horizontal flow sensor 121. The vertical flow sensor 122 can measure the airspeed without the composition of vectors and can determine the direction of airflow along the axis based on the output value.

Figure 7:
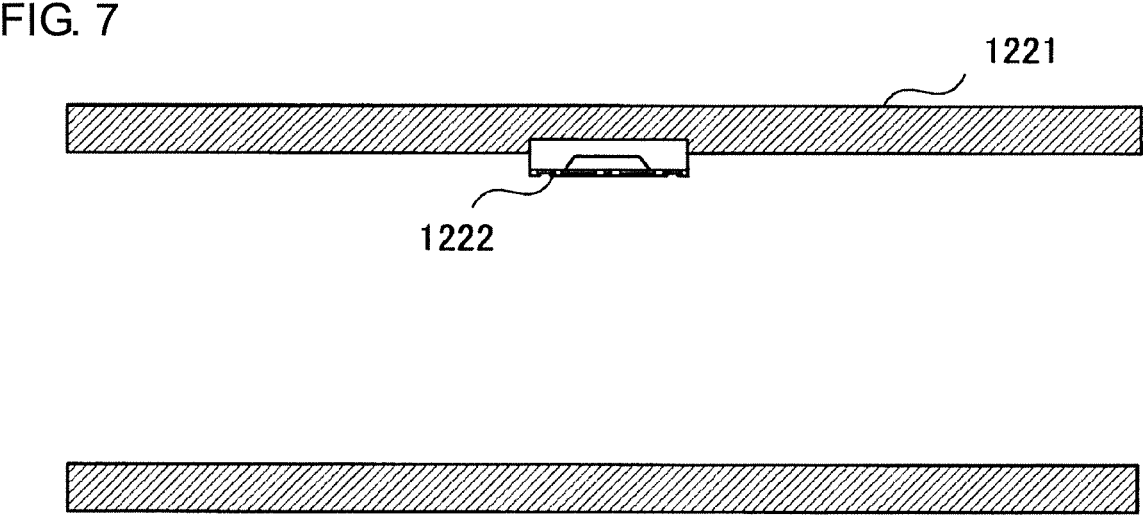
FIG. 7 is a longitudinal cross-sectional view of an example vertical flow sensor.
Figure 8:
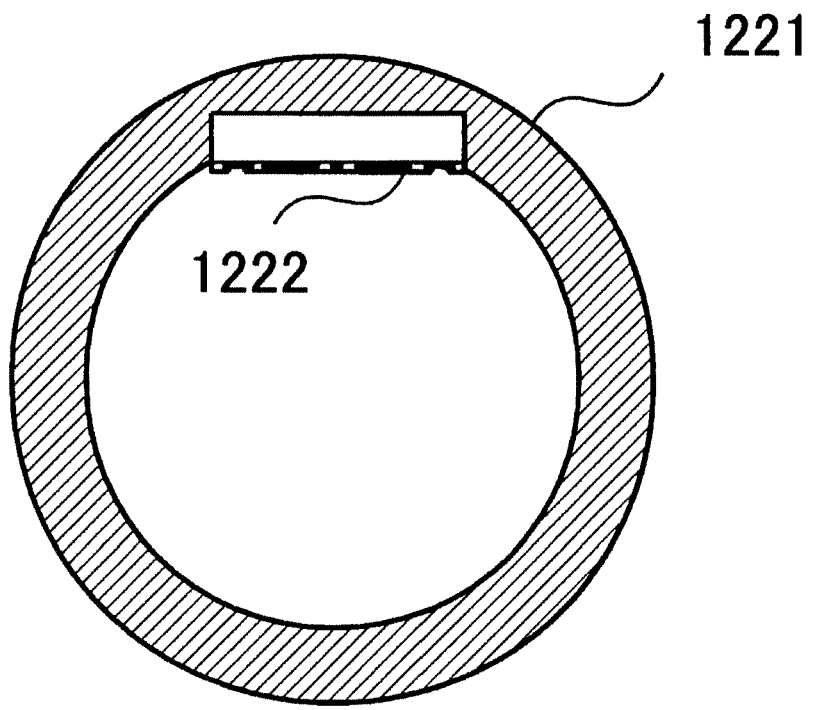
FIG. 8 is a cross-sectional view of the vertical flow sensor.
Figure 9:
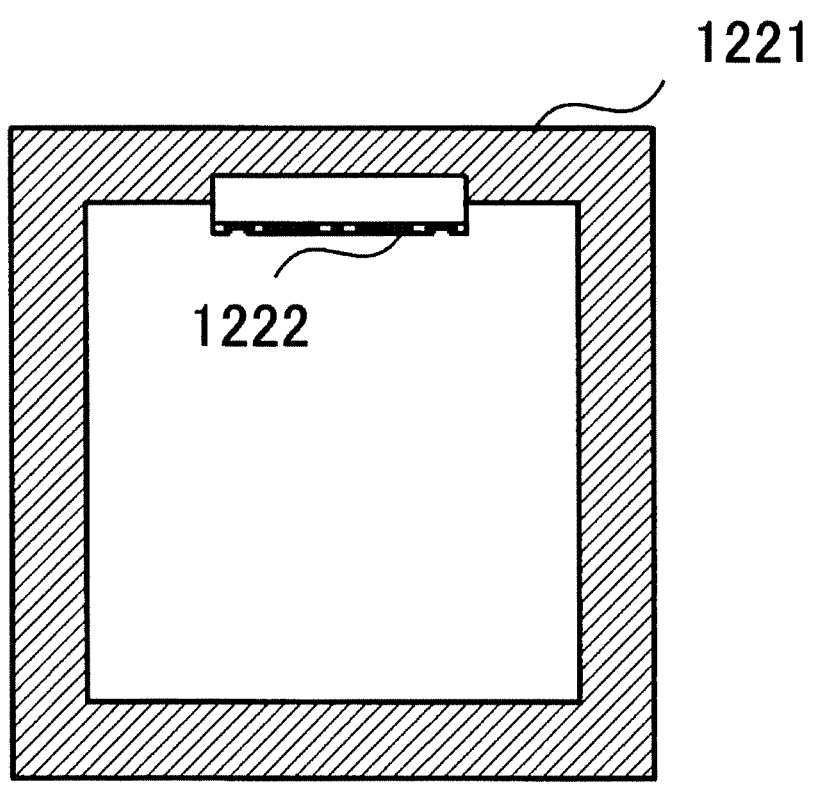
FIG. 9 is a cross-sectional view of a vertical flow sensor according to a modification.

FIG. 7 is a longitudinal cross-sectional view of an example of the vertical flow sensor 122. FIG. 8 is a cross-sectional view of the vertical flow sensor 122. The vertical flow sensor 122 includes a tubular casing 1221 and a 1-axis flow sensor 1222 contained in the casing. The 1-axis flow sensor 1222 includes the sensor elements described above to measure the velocity of air flowing through the tubular casing. The casing 1221 is, for example, a straight tube having its tube axis extending in the same direction as the axis direction in which the sensor elements detect the flow velocity. As shown in FIG. 8, the casing 1221 for the vertical flow sensor 122 is, for example, tubular and has a circular cross-section. The tubular casing 1221 for the vertical flow sensor 122 may have a rectangular cross-section as shown in FIG. 9, or may have any other cross-section. To prevent foreign matter from entering, the casing 1221 may not be a straight tube but may be a bypass tube including a main flow channel branching to sub-channels, each of which contains a sensor to correct the flow velocity and the flow rate, or may include a curved flow channel defining a centrifugal chamber, which functions as a cyclone to remove foreign matter. This vertical flow sensor 122 may be mounted on the multicopter 1 to have its tube axis (or the measurement direction) in the vertical direction to measure the vertical airspeed of the multicopter.

The temperature sensor 123 may be, for example, a thermocouple or a resistance thermometer sensor that measures the temperature (atmospheric temperature) around the multicopter 1. The atmospheric pressure sensor 124 may be, for example, a piezoresistive pressure sensor. The pressure sensor may also be, for example, an absolute pressure sensor for measuring a pressure with respect to a vacuum. The geomagnetic sensor 125 may be a 2-axis or 3-axis electromagnetic compass including elements such as a Hall element, a magnetoresistive element, or a magneto-impedance element.

The RF communicator 13 wirelessly communicates with the controller 2 using, for example, an electromagnetic wave with a predetermined frequency to receive an instruction from a user. The RF communicator 13 may also transmit an alert or another signal to the controller 2 in accordance with outputs from the set of sensors 12. The motor driver ESCs 14 control the speed of revolution of the rotor 15 in response to a signal from the processor 11.

The airspeed measurement system according to one or more embodiments of the present invention includes at least the horizontal flow sensor 121. In other words, the airspeed measurement system may eliminate some sensors in the set of the sensors 12 shown in FIG. 1. For example, the airspeed measurement system may simply include the horizontal flow sensor 121 to measure the horizontal airspeed of a low-speed flight vehicle.

Mount Positions of Sensors

Figure 10:
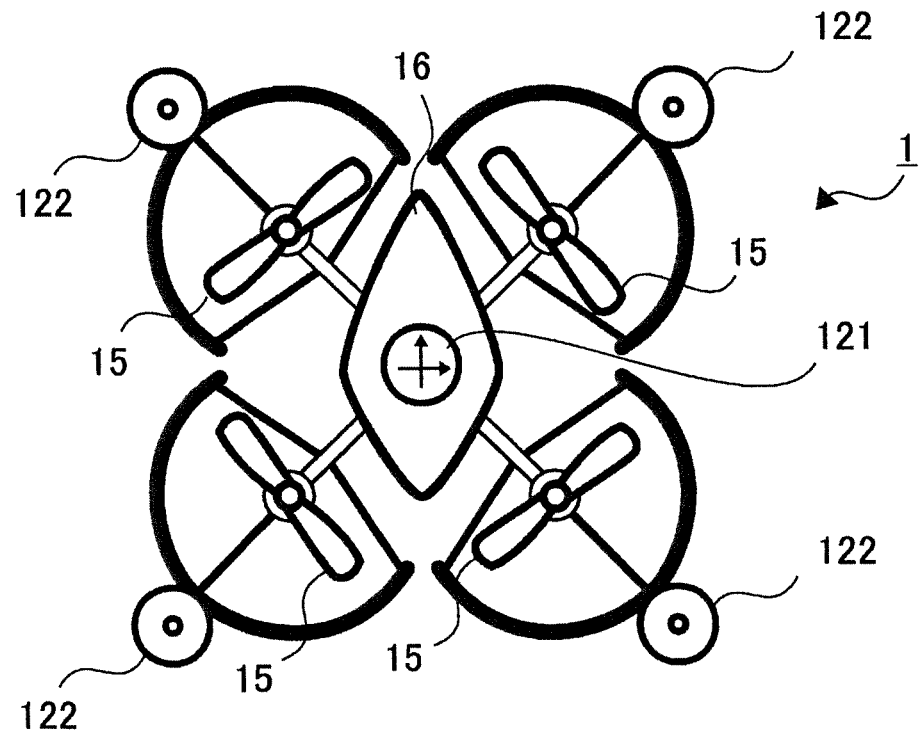
FIG. 10 is a schematic plan view of the multicopter showing the mount positions of the sensors.
Figure 11:
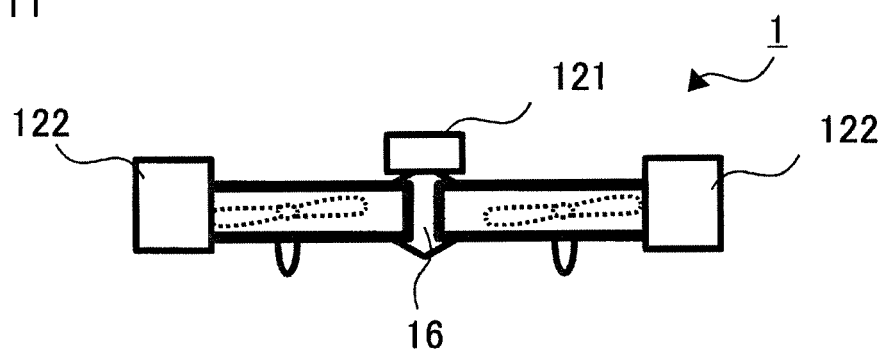
FIG. 11 is a schematic front view of the multicopter showing the mount positions of the sensors.

FIG. 10 is a schematic plan view of the multicopter 1 showing the mount positions of the sensors. FIG. 11 is a schematic front view of the multicopter 1 showing the mount positions of the sensors. FIGS. 10 and 11 illustrate the mount positions of the horizontal flow sensor 121 and the vertical flow sensors 122. For example, the horizontal flow sensor 121 is mounted on the top center of the body 16 of the multicopter 1. The horizontal flow sensor 121 is mounted in substantially the middle of the four rotors 15 as viewed from above to measure the horizontal airspeed in all directions around the periphery of the multicopter 1, or to reduce the influence of airflow generated by the rotors 15.

Each of the vertical flow sensors 122 is mounted outside the corresponding rotor bumper around the corresponding one of the four rotors 15. Each of the vertical flow sensors 122 is also mounted to avoid an overlap with the rotatable range of the rotor 15 as viewed from above. This structure can reduce the influence of airflow generated by the rotor 15. Each of the vertical flow sensors 122 is also mounted to avoid an overlap with the multicopter 1 as viewed from above. This allows air to flow through the casing 1221. The plurality of vertical flow sensors 122 are mounted as illustrated to allow the average airspeed to be obtained to reduce the influence of noise.

Figure 12:
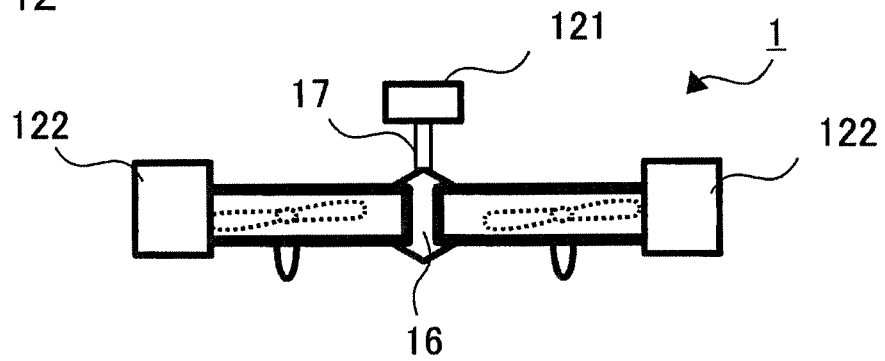
FIG. 12 is a schematic front view of the multicopter showing the mount positions of the sensors according to a modification.

FIG. 12 is a schematic front view of the multicopter 1 showing the mount positions of the sensors according to a modification. In the example shown in FIG. 12, the horizontal flow sensor 121 is supported vertically above the body 16 of the multicopter 1 with a support 17. This structure minimizes the influence of airflow along the contour of the body 16 of the multicopter 1 on the horizontal flow sensor 121. The horizontal flow sensor 121 may be mounted vertically below the body 16 of the multicopter 1. The multicopter 1 may include a plurality of horizontal flow sensors 121.

Figure 13:
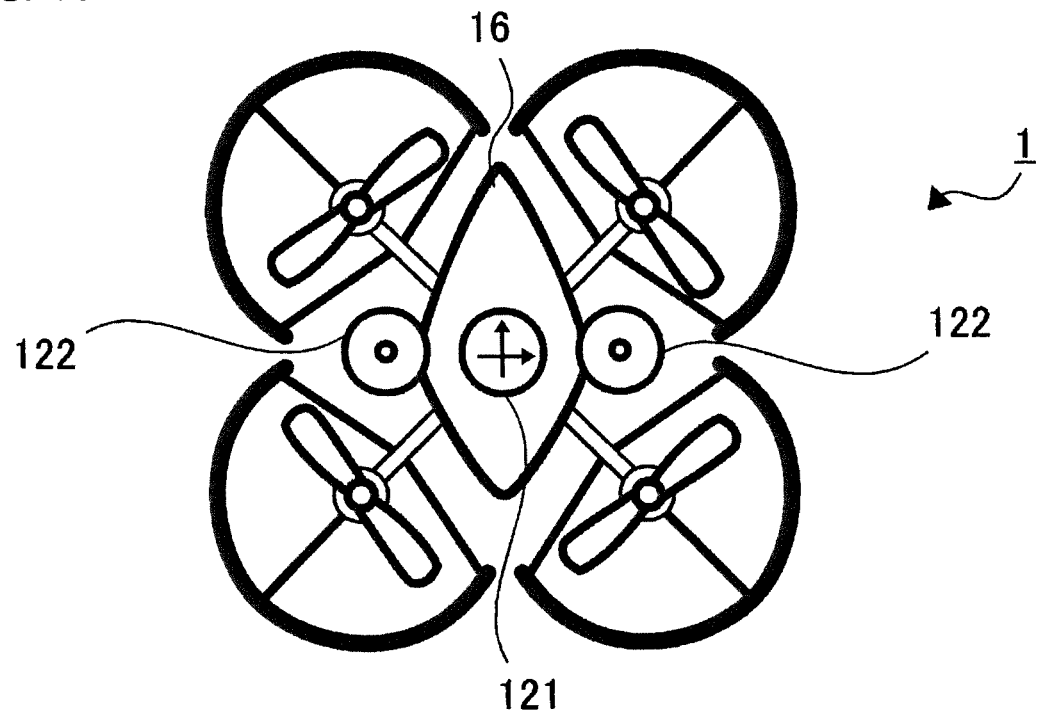
FIG. 13 is a schematic plan view of the multicopter showing the mount positions of the sensors according to a modification.
Figure 14:
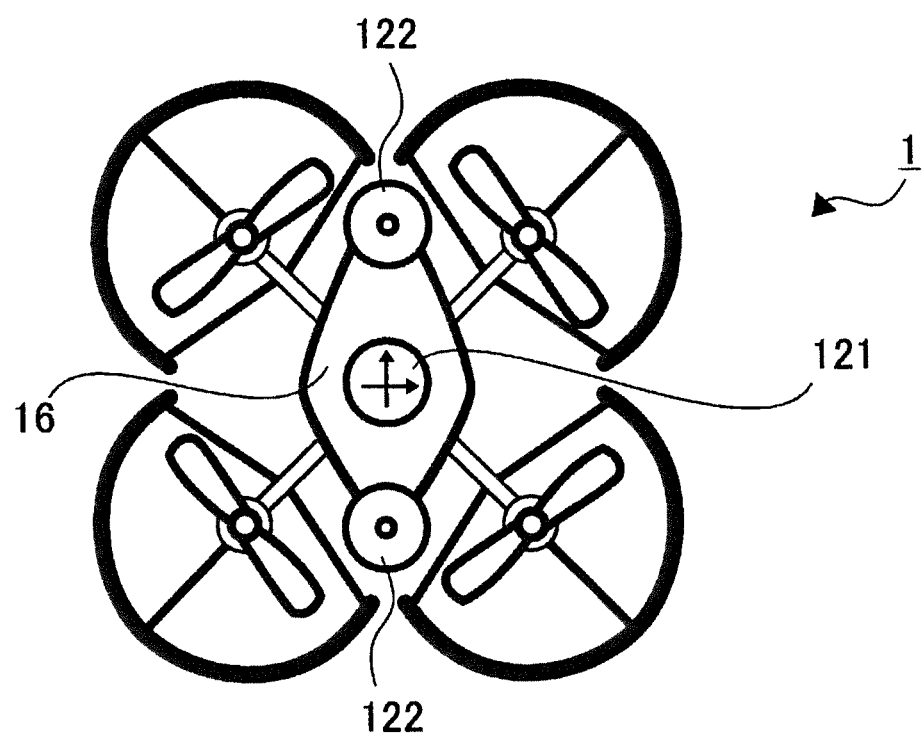
FIG. 14 is a schematic plan view of the multicopter showing the mount positions of the sensors according to a modification.

FIGS. 13 and 14 are schematic plan views of the multicopter 1 showing the mount positions of the sensors according to modifications. In the examples shown in FIG. 13 and FIG. 14, the vertical flow sensors 122 are mounted around the body 16 of the multicopter 1 and inside the four rotors 15. In these modifications as well, the vertical flow sensors 122 are mounted to avoid an overlap with the rotatable range of the rotor 15 and an overlap with the multicopter 1 as viewed from above. The multicopter 1 may include a plurality of vertical flow sensors 122.

The temperature sensor 123, the atmospheric pressure sensor 124, and the geomagnetic sensor 125 (all not shown) may be mounted at any positions unless the sensors affect the flight.

Control Process and Advantageous Effects

Figure 15:
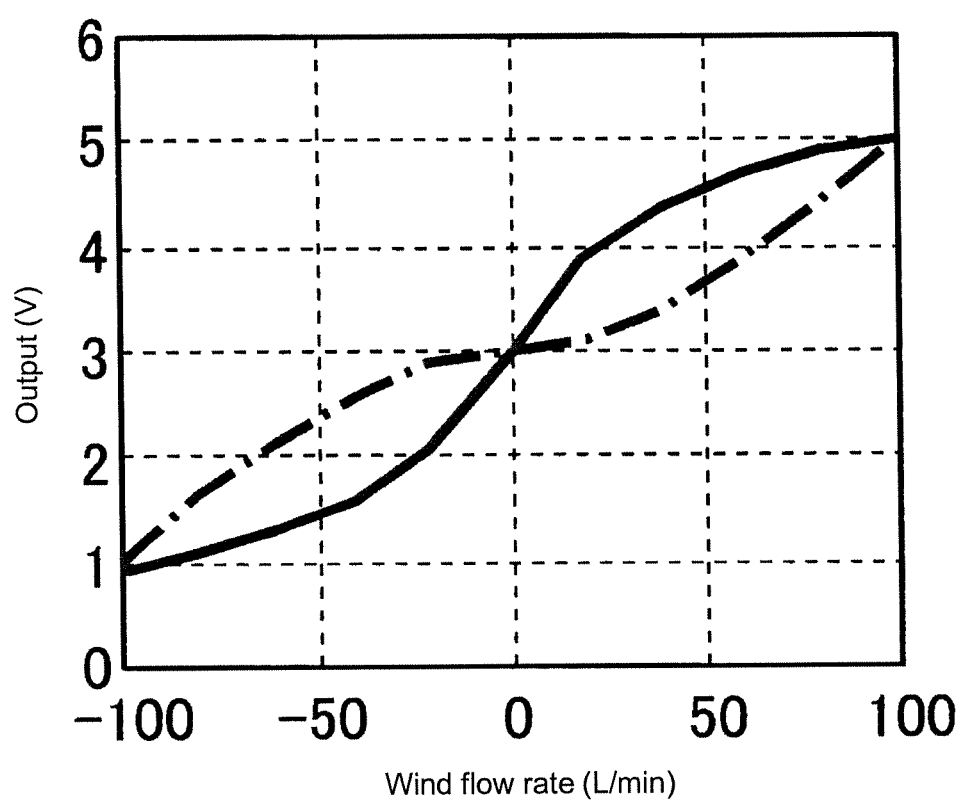
FIG. 15 is a graph showing the relationship between the wind flow rate in a predetermined direction and output values from the sensor.

As describe above, the horizontal flow sensor 121 in the airspeed measurement system allows horizontal measurement of the airspeed of a low-speed flight vehicle. In particular, the thermal flow sensor allows the system to be suitable for measuring the airspeed of a low-speed flight vehicle. FIG. 15 is a graph showing the wind flow rate in a predetermined direction on the horizontal axis, and output values indicating the airspeed obtained from the sensor on the vertical axis. A solid line indicates outputs from the thermal flow sensor described above, whereas a dot-and-dash line indicates outputs from a pitot tube. The pitot tube, which measures the airspeed based on the difference between pressures, is less sensitive at low speeds. For example, the pitot tube may not detect an airspeed of 15 m/s or less. In contrast, the thermal flow sensor is highly sensitive at low speeds, and thus is suitable for measuring the airspeed of a low-speed flight vehicle. Accurate airspeed measurement will enable more accurate estimation of possible flight times. The system may output an alert based on the estimated possible flight times or perform processing for changing the destination for the vehicle to fly to the controller 2 controlled by the user. In particular, the multicopter 1 that is automatically controlled to reach its destination may increase the accuracy of possible flight times, and may thus avoid a fall before reaching the destination.

Vertical measurement of the airspeed using the vertical flow sensor 122 will enable detection of an abrupt nosedive or an updraft. To perform an abrupt nosedive, for example, the number of revolutions of the rotor is reduced to lower the altitude. This causes the body to undergo hunting and easily lose its balance. Similarly, the body receiving an updraft can reduce the number of revolutions of the rotor, causing an uneven airflow to be received by each rotor and causing the body to easily lose its balance. The vertical measurement of the airspeed allows the attitude control unit 111 in the processor 11 to control the vehicle to horizontally move to recover its attitude, or to output an alert to, for example, the controller 2, which is controlled by the user.

When the system includes a plurality of vertical flow sensors 122, the vertical airspeed $v_z$ can be determined by calculating the average using Formula 4 below. The airspeed measured for each flow sensor may be averaged to reduce the influence of noise.

$$v_z = \frac{1}{n}\sum_{i=1}^{n} v_{zi} \tag{4}$$

In this formula, $v_{zi}$ is the output value from each vertical flow sensor 122, and n is the number of vertical flow sensors 122.

The airspeed $v_{xyz}$ for the three axes may be measured using an output from the horizontal flow sensor 121 and an output from the vertical flow sensor 122. The airspeed $v_{xyz}$ for the three axes may be determined using Formula 5 below.

$$v_{xyz} = \sqrt{v_x^2 + v_y^2 + v_z^2} \tag{5}$$

$v_x = v_{xyz} \sin\varphi \cos\theta$
$v_y = v_{xyz} \sin\varphi \sin\theta$
$v_z = v_{xyz} \cos\varphi$ In this formula, $\varphi$ is the angle between a vector $v_{xyz}$ and the Z-axis, and $\theta$ is the angle between a vector in $v_{xyz}$ direction and the X-axis in the XY-plane.

The atmospheric pressure sensor is, for example, an existing absolute pressure sensor that measures the altitude of the multicopter 1. The horizontal flow sensor 121 and the vertical flow sensor 122 described above are thermal flow sensors, which are susceptible to the density of air. When, for example, the wind speed is measured based on the heat movement, the sensor at the higher altitude and thus with the thinner air becomes less sensitive. The airspeed may be corrected using the measurement values obtained by the atmospheric pressure sensor 124 or the measurement values from the temperature sensor 123 using the function described below.

$v_c = f(v_r, p_a, T)$

In the formula, $v_c$ is the corrected airspeed, $v_r$ is the uncorrected airspeed, $p_a$ is the pressure or altitude information, and T is the measurement value obtained by the temperature sensor 123.

For example, the thermal diffusivity D of the thermal flow sensor is determined using Formula 6 below. The output sensitivity is determined by the thermal diffusivity of the air.

$$D = \frac{\lambda}{\rho \times Cp} \tag{6}$$

The relational expression showing the relationship between the density of air, and the temperature and the pressure is obtained using Formula 7 below, which is the equation of state of an ideal gas, and the molecular weight M. The relational expression is then as written by Formula 8 below.

$$PV = nRT \tag{7}$$

In this formula, P is pressure, V is volume, n is the amount of substance, R is a gas constant, and T is temperature.

$$\rho = M \cdot \frac{n}{V} = M \cdot \frac{P}{RT} \tag{8}$$

The formula can be transformed into Formula 9 below to show the relationship between the thermal diffusivity, and the temperature and the pressure.

$$D = \frac{\lambda \cdot RT}{M \cdot P \cdot Cp} \tag{9}$$

The corrected airspeed $v_c$ described above can be written using, for example, the function in Formula 10 below.

$$v_c = v_r \frac{D'}{D} \tag{10}$$

In this formula, D is the thermal diffusivity in a reference state, whereas D' is the thermal diffusivity based on the current temperature and the current atmospheric pressure.

The geomagnetic sensor 125 enables determination of the direction in which the air flows (in other words, the absolute orientation) at the determined airspeed. The deviation angle measured by the horizontal flow sensor 121 described above indicates information about a relative direction with respect to the sensor orientation. The orientation information indicating the orientation of the multicopter 1 obtained by the geomagnetic sensor 125 can be used to calculate the orientation of the airflow. Such orientation information may be useful to control the multicopter 1 to move automatically.

Modifications

Figure 16:
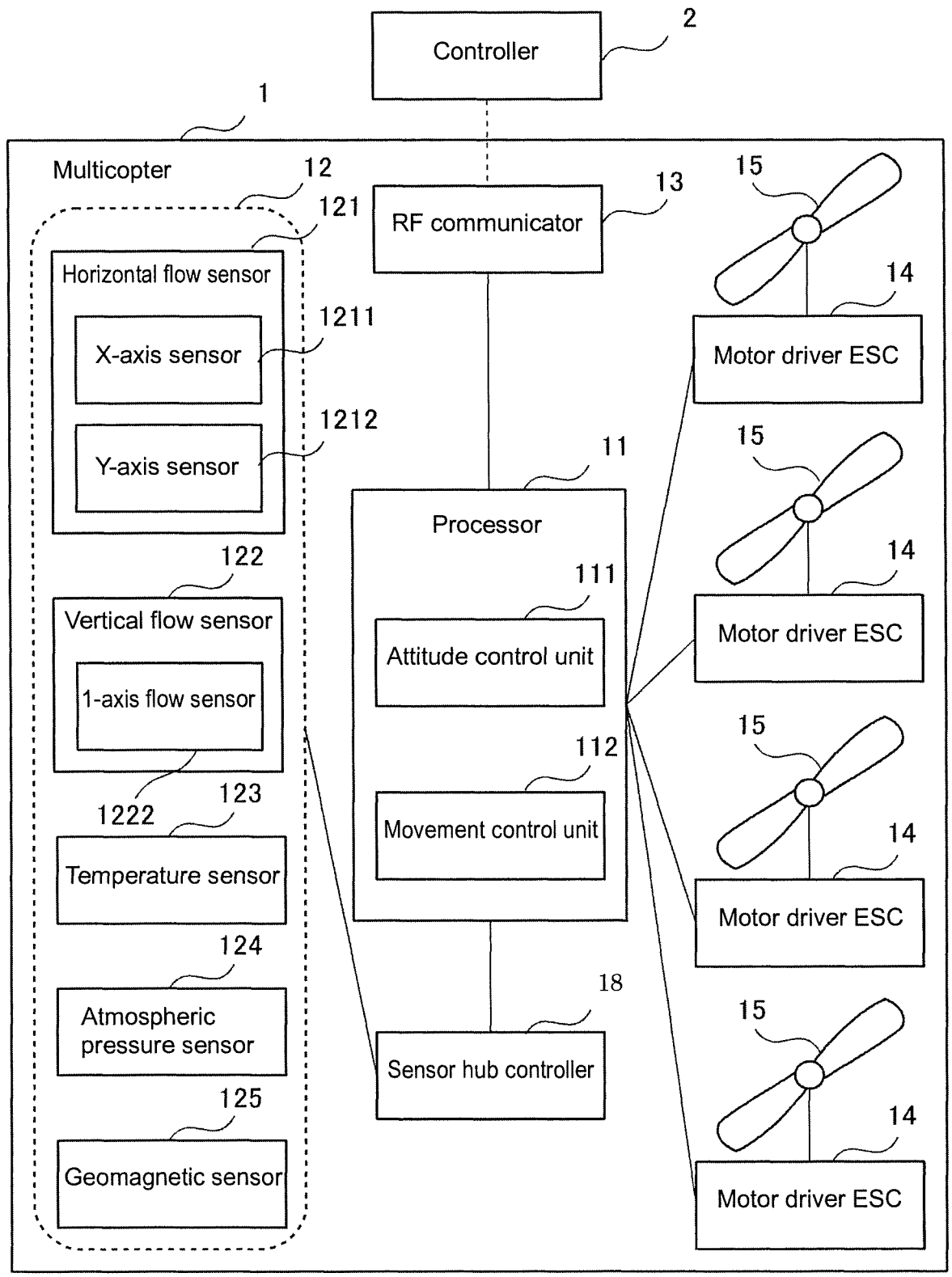
FIG. 16 is a block diagram of a multicopter including an airspeed measurement system according to a modification.

FIG. 16 is a block diagram of a multicopter including an airspeed measurement system according to a modification.

The components of the multicopter 1 in FIG. 16 corresponding to the components described in the embodiment shown in FIG. 1 are given the same reference numerals, and will not be described in detail. The multicopter 1 according to this modification includes a sensor hub controller 18 between the processor 11 and the set of sensors 12. The sensor hub controller 18 is a processing unit for controlling the set of sensors 12. The additional sensor hub controller 18 can reduce the processing load on the processor 11 for controlling the attitude or movement of the multicopter 1. The sensor hub controller 18 may use outputs from the sensors, and output control information for the multicopter 1 to the processor 11. For example, at least one of the sensors shown in the figure and the sensor hub controller 18 may be modularized to provide a general-purpose sensor system.

Although the horizontal flow sensor 121 shown in FIGS. 2 to 4 includes two 1-axis flow sensors that are mounted orthogonal to each other, the horizontal flow sensor 121 may not have this structure. For example, the sensor may be a 2-axis flow sensor having two axes that are orthogonal to each other at the center of one heat source. The 2-axis flow sensor may include a single sensor element including temperature sensors arranged on both sides of the heat source for each of the two axes.

Although the multicopter having four rotors has been described in the above example, the invention may be applicable to another low-speed flight vehicle. For example, the invention may be applied to a multicopter with eight rotors or to a helicopter with a single main rotor, or may be applied to a tilt rotor, which has a rotor angle adjustable relative to its body or to an airship powered by gas.

Airspeed Correction Based on Body Roll

Figure 17:
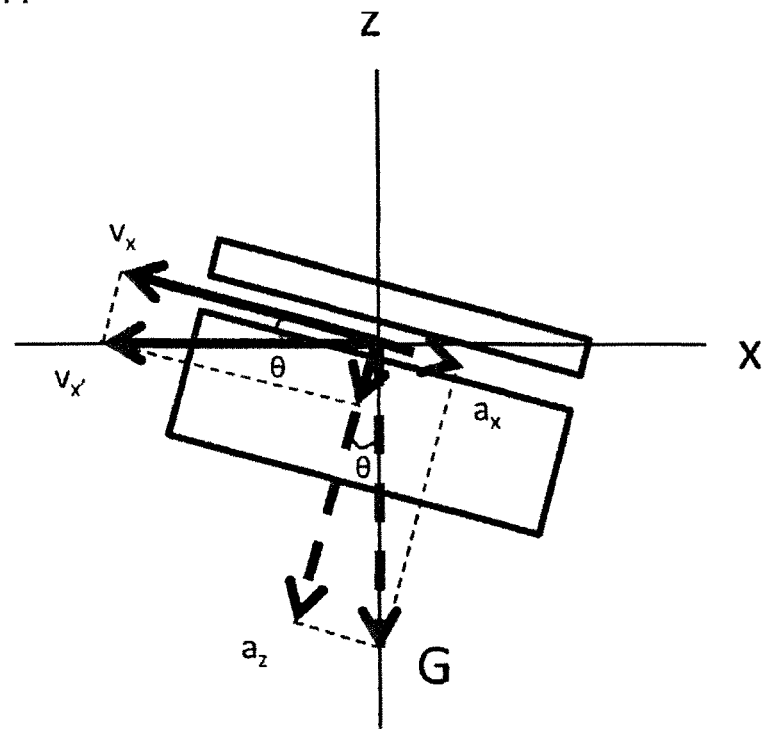
FIG. 17 is a diagram describing a correction for the airspeed when a body rolls during flight.

FIG. 17 is a diagram describing a correction for the airspeed when a body rolls during flight. In this modification, the system includes a 3-axis acceleration sensor based on, for example, capacitance detection or piezoresistance. The 3-axis acceleration sensor has its X-axis and Y-axis corresponding to the two axes of the horizontal flow sensor 121 according to the above embodiments. The system calculates the true horizontal acceleration $v_x'$ using a tilt angle $\theta$ of the body, which is calculated based on the acceleration along the three axes.

FIG. 17 shows example measurement values in the XZ-plane obtained by the 3-axis acceleration sensor. The 3-axis acceleration sensor obtains a measurement value $a_x$ in X-direction (indicated by a dashed arrow), a measurement value $a_y$ in Y-direction (not shown), and a measurement value $a_z$ in Z-direction (indicated by a dashed arrow). As the acceleration G in the gravitational direction (true vertical direction) is known, the tilt angle $\cos\theta$ may be calculated using Formula 11 below.

$$\cos\theta = \frac{a_z}{G} \tag{11}$$

As described above, the 3-axis acceleration sensor has its X-axis and Y-axis corresponding to the two axes of the horizontal flow sensor 121 according to the above embodiments. The relationship between the measurement value obtained by the horizontal flow sensor 121 (the measurement value obtained by the X-axis sensor 1211 in the illustrated example) $v_x$ (indicated by a solid line) and the measurement value in true X-direction $v_x'$ (indicated by a solid arrow) can be written by Formula 12 below using the tilt angle $\cos\theta$.

$$\cos\theta = \frac{v_x}{v_x'} \tag{12}$$

The formula may be transformed into Formula 13 below to determine an acceleration $v_x'$ in true X-direction. The same applies to the acceleration in Y-direction.

$$v_x' = v_x \times \frac{G}{a_z} \tag{13}$$

Modification of Flow Sensor

Figure 18:
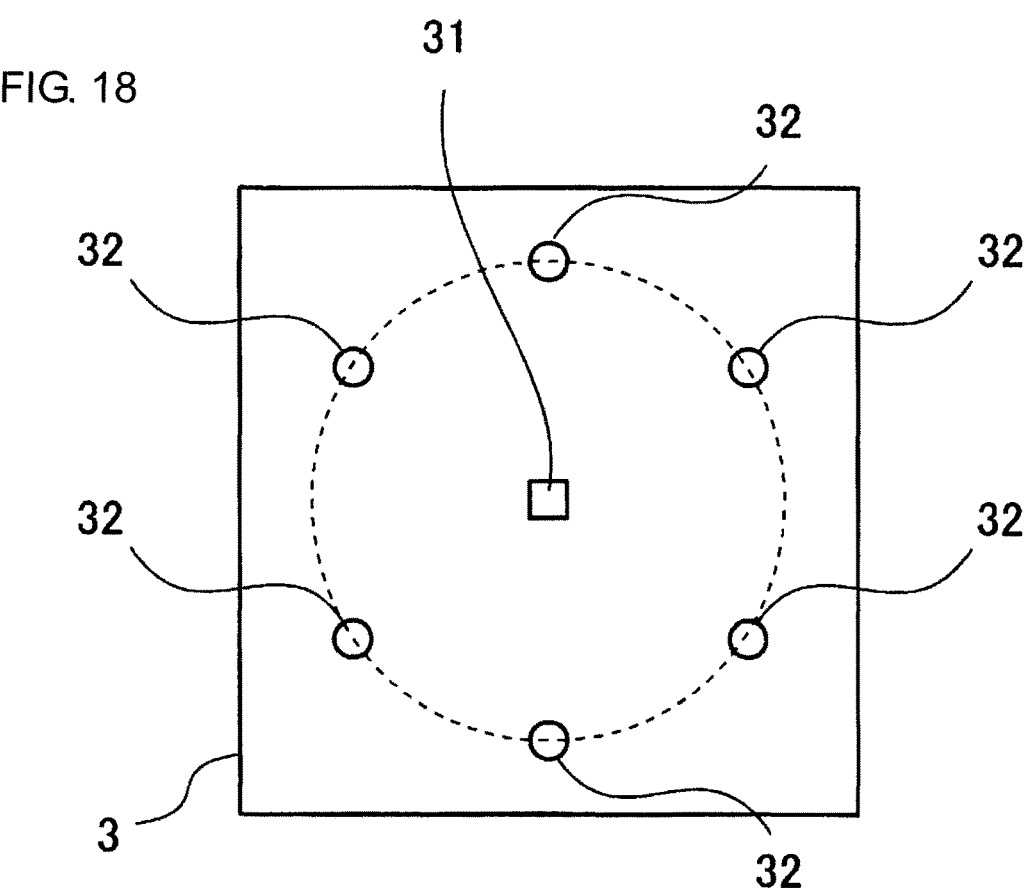
FIG. 18 is a diagram of a sensor element according to a modification.

The horizontal flow sensor may not be a sensor for measuring values along the two axes that are orthogonal to each other. The sensor element in FIG. 18 includes a heater at a center on a plane, and six thermopiles 32 circumferentially arranged about the heater at equal intervals on the plane. More specifically, the horizontal flow sensor according to the present modification has three axes spaced from each other by 120° on the horizontal plane. This structure also enables measurement of air flowing in a direction of low- to high-temperatures, and thus enables airspeed calculation. The airspeed can be calculated using a flow sensor that can measure airspeed along at least two axes.

REFERENCE SIGNS LIST

1 multicopter
11 processor
111 attitude control unit
112 movement control unit
12 set of sensors
121 horizontal flow sensor
1211 X-axis sensor
1212 Y-axis sensor
122 vertical flow sensor
1221 casing
1222 1-axis flow sensor
123 temperature sensor
124 atmospheric pressure sensor
125 geomagnetic sensor
13 RF communicator
14 motor driver ESC
15 rotor
16 body
17 support
18 sensor hub controller
2 controller
3 sensor element
31 heater
32 thermopile
33 ambient temperature sensor

The invention claimed is:

1. An airspeed measurement system for a flight vehicle, the system comprising:
   a base,
   a cover disposed a predetermined space above the base, and
   a flow sensor configured to measure an airspeed along at least two axes in a horizontal direction during flight of the flight vehicle,
   a 1-axis flow sensor configured to measure an airspeed along an axis in a vertical direction during flight of the flight vehicle, and a tubular casing mounted on the flight vehicle and coaxially aligned with the axis in the vertical direction,
wherein the 1-axis flow sensor is contained in the tubular casing, and
wherein the base and the cover are connected with a rod, and the predetermined space between the cover and the base provides an air passage allowing passage of air in a horizontal omnidirectional direction.

2. The airspeed measurement system according to claim 1,
wherein the flow sensor is a 2-axis flow sensor configured to measure the airspeed along two axes that are orthogonal to each other in a horizontal direction during flight of the flight vehicle.

3. The airspeed measurement system according to claim 2,
wherein the 2-axis flow sensor is a 2-axis thermal flow sensor including at least one heat source and two sets of temperature sensors that are arranged along the two axes orthogonal to each other, and
wherein the temperature sensors in each set are arranged on both sides of the heat source in one axis direction of the heat source.

4. The airspeed measurement system according to claim 1,
wherein the 1-axis flow sensor is a 1-axis thermal flow sensor including a heat source and temperature sensors that are arranged on both sides of the heat source in the vertical direction during flight of the flight vehicle.

5. The airspeed measurement system according to claim 1, further comprising:
a temperature sensor configured to measure a temperature around the flight vehicle, an atmospheric pressure sensor configured to measure an atmospheric pressure around the flight vehicle.

6. The airspeed measurement system according claim 1,
wherein the flight vehicle is a multicopter including a plurality of rotary wings.

7. The airspeed measurement system according claim 1,
wherein the flight vehicle includes a flight vehicle body and a plurality of rotary wings arranged around the flight vehicle body in a vertical direction during flight, and
wherein the flow sensor is mounted on the flight vehicle body.

8. The airspeed measurement system according to claim 1,
wherein the flight vehicle includes a flight vehicle body and a plurality of rotary wings arranged around the flight vehicle body in the vertical direction during flight, and
wherein the 1-axis flow sensor is mounted outside the rotary wing with respect to the flight vehicle body.

9. The airspeed measurement system according to claim 2, further comprising:
a temperature sensor configured to measure a temperature around the flight vehicle, an atmospheric pressure sensor configured to measure an atmospheric pressure around the flight vehicle.

10. The airspeed measurement system according to claim 3, further comprising:
a temperature sensor configured to measure a temperature around the flight vehicle, an atmospheric pressure sensor configured to measure an atmospheric pressure around the flight vehicle.

11. The airspeed measurement system according to claim 4, further comprising:
a temperature sensor configured to measure a temperature around the flight vehicle, an atmospheric pressure sensor configured to measure an atmospheric pressure around the flight vehicle.

12. The airspeed measurement system according to claim 2,
wherein the flight vehicle is a multicopter including a plurality of rotary wings.

13. The airspeed measurement system according to claim 3,
wherein the flight vehicle is a multicopter including a plurality of rotary wings.

14. The airspeed measurement system according to claim 4,
wherein the flight vehicle is a multicopter including a plurality of rotary wings.

15. The airspeed measurement system according to claim 5,
wherein the flight vehicle is a multicopter including a plurality of rotary wings.

* * * * *